United States Patent
Corbett et al.

(10) Patent No.: US 10,242,179 B1
(45) Date of Patent: Mar. 26, 2019

(54) HIGH-INTEGRITY MULTI-CORE HETEROGENEOUS PROCESSING ENVIRONMENTS

(71) Applicant: Rockwell Collins, Inc., Cedar Rapids, IA (US)

(72) Inventors: Matthew P. Corbett, Mount Vernon, IA (US); Jason R. Owen, Marion, IA (US); Nicholas H. Bloom, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 182 days.

(21) Appl. No.: 15/617,129

(22) Filed: Jun. 8, 2017

(51) Int. Cl.
| | |
|---|---|
| *G06F 11/00* | (2006.01) |
| *G06F 21/52* | (2013.01) |
| *G06F 21/50* | (2013.01) |
| *G06F 11/273* | (2006.01) |
| *G06F 11/22* | (2006.01) |
| *G06F 11/27* | (2006.01) |
| *G06F 9/48* | (2006.01) |
| *G06F 21/64* | (2013.01) |

(52) U.S. Cl.
CPC .......... *G06F 21/52* (2013.01); *G06F 11/2236* (2013.01); *G06F 11/27* (2013.01); *G06F 11/273* (2013.01); *G06F 21/50* (2013.01); *G06F 9/4843* (2013.01); *G06F 21/64* (2013.01)

(58) Field of Classification Search
CPC ..... G06F 11/27; G06F 11/2236; G06F 11/273
See application file for complete search history.

(56) References Cited

U.S. PATENT DOCUMENTS

| | | | |
|---|---|---|---|
| 6,357,020 B1 * | 3/2002 | Bohizic | G06F 11/26 714/25 |
| 2003/0005275 A1 * | 1/2003 | Lam | G06F 11/1417 713/2 |
| 2009/0276738 A1 * | 11/2009 | Jain | G06F 17/5022 716/106 |
| 2010/0135164 A1 * | 6/2010 | Rofougaran | G06F 11/2294 370/248 |
| 2014/0282412 A1 * | 9/2014 | Howard | G06F 8/30 717/124 |

* cited by examiner

*Primary Examiner* — Charles Ehne
(74) *Attorney, Agent, or Firm* — Angel N. Gerdzhikov; Donna P. Suchy; Daniel M. Barbieri

(57) ABSTRACT

A high-integrity multi-core heterogeneous processing environment and methods for high integrity computing on multi-core heterogeneous processing environments are disclosed. A multi-core heterogeneous processing environment may include an application processor with one or more processing cores and an integrity tester for executing integrity kernels on the application processor. The multi-core heterogeneous processing environment may further include an integrity processor having a different architecture than the application processor and an integrity manager operating on the integrity processor. The integrity manager may dynamically generate integrity kernels to test the functionality of the application processor prior to and/or subsequent to the execution of critical programs on the application processor. The integrity manager may identify one or more faults based on a result of the integrity kernel executed on the application processor and may further take corrective action based on identified faults such that an undetected fault rate remains below a selected integrity specification.

20 Claims, 2 Drawing Sheets

HIGH-INTEGRITY MULTI-CORE HETEROGENEOUS PROCESSING ENVIRONMENTS

BACKGROUND

A high-integrity computing environment may execute critical applications with an undetected fault rate smaller than an integrity specification that may be selected based on the demands of the critical applications. Further, high-integrity computing environments may typically be designed such that integrity-monitoring processes are transparent to the application software for compatibility and ease of application development. It may be desirable in many applications to develop high-integrity computing environments using Commercial off-the-shelf (COTS) devices to limit costs and leverage innovations in processing architectures. However, COTS device vendors are increasingly moving away from computing environments with discrete host processors towards highly-integrated multi-core system-on-chip (SoC) devices in which system performance, rather than determinism of a particular computation, is a primary design goal. For example, multi-core SoCs may not expose low-level busses for transparent access to processor computations and/or may feature asynchronous hardware events such as, but not limited to, asynchronous internal clock domain crossings, divergent branch predictions, translation lookaside buffer/cache states, or multi-core interference channel latency jitter. Further, multi-core SoCs may utilize internal scheduling to reorder and/or parallelize the execution of an input instruction set, which may impact the design of an integrity monitoring process. Multi-core SoCs may thus present challenges for the development of high-integrity computing environments using COTS devices that are transparent to the application software.

SUMMARY

In one aspect, embodiments of the inventive concepts disclosed herein are directed to a high-integrity multi-core heterogeneous processing environment. The high-integrity multi-core heterogeneous processing environment may include an application processor with one or more processing cores and an integrity tester for executing integrity kernels on the application processor. The high-integrity multi-core heterogeneous processing environment may further include an integrity processor with a different architecture than the application processor and an integrity manager operating on the integrity processor. The integrity manager may be configured to dynamically generate an integrity kernel to test various paths of the application processor. The integrity manager may further provide the integrity kernel to the integrity tester prior to the execution of a critical program on the application processor. The integrity manager may further identify one or more faults in the application processor based on a result of the integrity kernel executed on the application processor received from the integrity tester.

In a further aspect, embodiments of the inventive concepts disclosed herein are directed to a high-integrity multi-core heterogeneous processing environment. The high-integrity multi-core heterogeneous processing environment may include an application domain. The application domain may include an application processor with any number of processing cores. The application domain may further include a hypervisor to host any number of application-domain operating systems operating on the application processor. The application domain may further include any number of integrity testers for executing integrity kernels on the application processor. The high-integrity multi-core heterogeneous processing environment may further include an integrity domain to support the application domain. The integrity domain may include an integrity processor with an architecture different than the application processor. The integrity domain may further include a real-time kernel to host an integrity-domain operating system. The integrity-domain operating system may include an integrity manager to dynamically generate an integrity kernel to test various of paths of the application processor. The integrity manager may further provide the integrity kernel to an integrity tester prior to execution of a critical program by an application-domain operating system. The integrity manager may further identify one or more faults in the application processor based on a result of the integrity kernel executed on the application processor received from the integrity tester.

In a further aspect, embodiments of the inventive concepts disclosed herein are directed to a method for high-integrity computing. The method may include dynamically generating, in an integrity domain of a multi-core heterogeneous processing environment, an integrity kernel to test a variety of paths of an application processor in an application domain of the multi-core heterogeneous processing environment. The application processor may include any number of processing cores having a different architecture than processing cores of an integrity processor of the integrity domain. The method may further include providing the integrity kernel to the application domain prior to execution of a critical program on the application processor. The method may further include executing the integrity kernel on the application processor. The method may further include providing a result of the integrity kernel executed on the application processor to the integrity domain. The method may further include identifying one or more faults in the application processor based on the result of the integrity kernel executed on the application processor.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
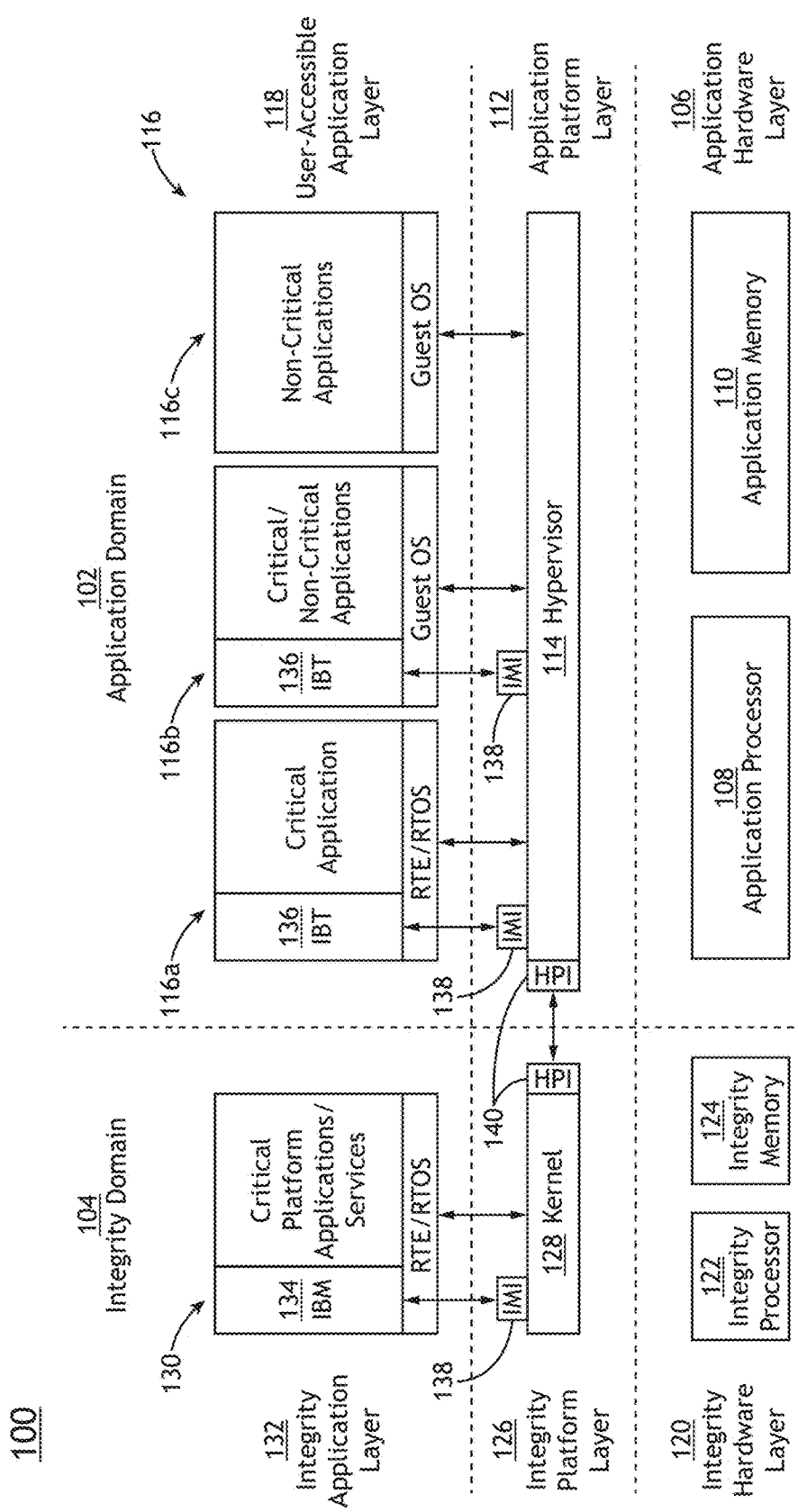
FIG. 1 is conceptual view of an exemplary embodiment of a high-integrity multi-core heterogeneous processing environment configured in accordance with one or more embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to providing systems and methods for high-integrity computing in multi-core SoC devices. High-integrity computing typically specifies that the undetected fault rate, or ratio of undetected computations resulting in a fault to total computations, associated with the execution of a critical application remain below a selected integrity specification. The value of the integrity specification may vary based on the demands of the application. High-integrity computational systems such as those used in flight critical avionics systems may demand, but are not required to include, undetected fault rates on the order of 1E-10. In a general sense, high-integrity computing environments may detect computational faults and provide necessary corrective actions (e.g. restarting one or more processing cores) to maintain an undetected fault rate below the selected integrity specification.

Embodiments in accordance with the inventive concepts disclosed herein are directed to generating integrity kernels (e.g. built-in-test environment (BITE) kernels) including executable code designed to test a plurality of processing paths of an application processor on which critical applications may operate. In some embodiments, a high-integrity multi-core heterogeneous processing environment includes an application domain to serve as a user-accessible computing platform and an integrity domain to provide transparent integrity services for the application domain. The application domain may include the application processor for the execution of critical programs requiring integrity monitoring, and the integrity domain including a distinct integrity processor. The application domain and the integrity domain may further include distinct platform and application software layers necessary for providing high-integrity computing. Software developers may thus provide applications to operate on the general purpose computing platform provided by the application domain with the benefit of transparent computational integrity within the selected integrity specification provided by the integrity domain. In this regard, software developers may not be required to incorporate integrity-monitoring functionality at the application level. In some embodiments, the application domain of a high-integrity multi-core heterogeneous processing environment designed in accordance with inventive concepts disclosed herein may provide a computing platform for both critical applications requiring integrity monitoring as well as non-critical programs not requiring integrity monitoring. For example, applications may be selectively categorized as critical or non-critical in the application domain to control whether integrity services are utilized. In this regard, the resources of the high-integrity multi-core heterogeneous processing environment may be efficiently utilized.

In some embodiments, the integrity kernels are generated within the integrity domain operating on a distinct processor within the high-integrity multi-core heterogeneous processing environment (e.g. the integrity processor), executed on the application processor, and evaluated on the integrity processor to detect faults. In this regard, the integrity kernels may be designed to test the functionality of the application processor by verifying the output of the integrity kernels executed on the application processor against expected results. Appropriate action may then be taken in the event of a miscompare (e.g. a fault) between an integrity kernel executed on the application processor and an expected result. For example, the fault may be logged in persistent storage for further diagnostics. By way of another example, a reset signal may be sent to a portion of the high-integrity multi-core heterogeneous processing environment such as, but not limited to an offending core of the application processor, an application platform operating on the application processor.

In some embodiments, the integrity kernels are generated and evaluated at a rate sufficient to ensure that a failure of the application processor during the execution of a critical application (e.g. the generation of erroneous or misleading data) would be detected. For example, integrity kernels may be executed on the application processor and evaluated prior to and/or subsequent to the execution of a critical application on the application processor. By way of another example, integrity kernels may be executed and evaluated periodically. Further, integrity kernels may be designed to execute quickly to minimize the impact on the performance of the high-integrity multi-core heterogeneous processing environment as a whole.

Generating and evaluating integrity kernels may thus provide high-integrity computing in systems by probing the application processor to ensure operational accuracy and may not directly evaluate the computations of the application processor during executing of a critical application (e.g. using a lockstep monitor to evaluate simultaneous executions of the critical program). Accordingly, generating and evaluating integrity kernels may provide high-integrity computing in systems for which the execution of instructions is not deterministic.

In some embodiments, integrity kernels are dynamically generated such that a response associated with each execution of an integrity kernel may be unique. In this regard, integrity kernels may dynamically test of the functionality of the application processor to provide robust integrity monitoring. For example, dynamically-generated integrity kernels with unique results associated with each execution run may prevent situations in which the application processor that would otherwise produce a fault provides a correct expected result through subverting means such as, but not limited to, providing a cached answer associated with a previously-executed integrity kernel. Accordingly, dynamically generated integrity kernels may provide assurance that a computation of the integrity kernel is actually carried out during runtime by the application processor.

In some embodiments, an integrity kernel includes an executable instruction set that may operate on one or more input seeds to test the functionality of the application processor. This executable instruction set may be, but is not required to be, provided as assembly code. Integrity kernels may thus include highly customized sets of executable instructions tailored to test a plurality of paths of a specific application processor. Integrity kernel may be further designed to test any non-deterministic functions of an application processor such as, but not limited to, asynchronous events or superscalar processes for optimizing instruction execution.

Accordingly, an integrity kernel may be dynamically generated through dynamic generation of the executable instruction set and/or the input seeds. For example, an integrity kernel may be dynamically generated by providing a random set of input seeds to an executable instruction set. In this regard, a result of the execution of the integrity kernel on the application process may be unique. By way of another example, an integrity kernel may be dynamically generated through dynamic generation of the executable instruction set. In one instance, an executable instruction set may be selected from a list of predetermined executable instruction sets (e.g. randomly or based on a rotation through the list). In another instance, an executable instruction set may be dynamically generated on the fly based on a constrained-random mix of instructions to exercise various paths of the application processor.

The expected results to the execution of integrity kernels on the application processor may include any type of response suitable for evaluating the functionality of the application processor. For example, expected results to integrity kernels may include, but are not limited to, hash values associated with correct computations of an executed integrity kernel. Further, the expected results may be generated by any means. In some embodiments, the expected result to an integrity kernel (e.g. a combination of an executable instruction set an input seeds) may be generated by executing the integrity kernel on the integrity processor on the fly for direct comparison with the integrity kernel executed on the application processor. In some embodiments, the expected result to an integrity kernel may be predetermined. For example, a series of integrity kernels may be executed on the integrity processor and stored (e.g. as a look-up table) in persistent storage (e.g. a memory) and used to evaluate the integrity kernels executed on the fly on the application processor.

In some embodiments, the high-integrity multi-core heterogeneous processing environment includes heterogeneous multicore processors such that the integrity processor is a distinct processor within the high-integrity multi-core heterogeneous processing environment that is architecturally dissimilar to the application processor. In this regard, the integrity processor may provide independent monitoring of the application processor. A integrity processor that is dissimilar to and distinct from the application processor, but within the high-integrity multi-core heterogeneous processing environment may thus avoid common-mode errors associated with execution of integrity kernels that may lead to false-positive evaluations of the application kernel and reduced integrity of the processing environment.

The application processor and the integrity processors may include any type of processing cores known in the art (e.g. e6500 or i7), so long as the architectures of the application processor and the integrity processor are dissimilar. For example, the application processor may include any number of homogeneous processing cores and the integrity processor may include one or more processing cores of a different architecture.

In some embodiments, the integrity domain of the high-integrity multi-core heterogeneous processing environment is itself a high-integrity processing sub-environment. For example, the integrity processor may include, but is not required to include, two or more processing cores configured to simultaneously execute the same instructions in a lockstep fashion. The integrity domain may further include a comparator to compare results from the two or more processing cores of the integrity processor and reset offending cores in the event of a miscompare. The integrity domain may thus operate with a selected integrity specification. In this regard, the integrity domain may provide robust monitoring of the application domain with minimal system-wide faults corresponding to undetected faults of the integrity processor. Further, the integrity specifications of the integrity domain and the high-integrity multi-core heterogeneous processing environment as a whole may be the same or different. For example, the high-integrity multi-core heterogeneous processing environment may provide an undetected fault rate that is lower than that of the integrity domain.

Referring now to FIG. 1, a conceptual view of an exemplary embodiment of a high-integrity multi-core heterogeneous processing environment 100 configured in accordance with one or more embodiments of the inventive concepts disclosed herein is shown.

The high-integrity multi-core heterogeneous processing environment 100 includes an application domain 102 providing a user-accessible computing platform and a user-restricted integrity domain 104 providing transparent integrity services for the application domain 102. In this regard, components within the integrity domain 104 may ensure that critical applications operating in the application domain 102 achieve an undetected fault rate below the selected integrity specification.

Software developers may develop applications for the high-integrity multi-core heterogeneous processing environment 100 based on the platform provided by the application domain 102, and the transparent integrity services provided by the integrity domain 104 may enable critical applications operating in the application domain 102 to achieve undetected fault rates below the selected integrity specification without an additional burden on the developers to integrate integrity monitoring functionality at the application level.

The high-integrity multi-core heterogeneous processing environment 100 includes an application hardware layer 106 with an application processor 108 and application memory 110 for executing applications in the application domain 102. The application processor 108 may include any number of processing cores. For example, the application processor 108 may include a single processing core. By way of another example, the application processor 108 may include a homogeneous multi-core cluster of computing elements. By way of an additional example, the application processor 108 may include a heterogeneous multi-core cluster of computing elements. The application processor 108 may further include any type of processing architecture such as, but not limited to a Power Architecture (e.g. e6500), an ARM architecture, or the like.

It is recognized that the term "processor" may be broadly defined to encompass any device having one or more processing elements, which execute program instructions from a memory medium (e.g. application memory 110). Further, the application memory 110 may include any storage medium known in the art suitable for storing program instructions executable by the application processor 108. For example, the application memory 110 may include a non-transitory memory medium. By way of another example, the application memory 110 may include, but is not limited to, a read-only memory, a random access memory, a magnetic or optical memory device (e.g., disk), a magnetic tape, a solid state drive and the like.

In some embodiments, the application domain 102 includes an application platform layer 112 including a hypervisor 114. The hypervisor 114 may host one or more application-domain operating systems 116 in a user-accessible application layer 118 operating on the application processor 108. The hypervisor 114 may further host any type of partitioned or non-partitioned application-domain operating system 116. For example, an application-domain operating system 116 may include one or more real-time operating systems (RTOSs) or real-time environments (RTE) for executing critical real-time applications requiring integrity monitoring. In one instance, an RTOS (e.g. application-domain operating system 116a) may be dedicated to a single critical application requiring real-time operation. Further, different tasks of the critical application may be provided dedicated partitions having dedicated fixed resources (e.g. memory blocks).

By way of another example, an application-domain operating system 116 may include one or more integrity-enabled guest operating systems (e.g. application-domain operating system 116b) for executing critical applications requiring integrity monitoring but not real-time performance. Integrity-enabled guest operating systems may be dedicated to critical applications or may additionally execute non-critical applications not requiring integrity monitoring.

By way of another example, an application-domain operating system 116 may include one or more non-critical guest operating systems (e.g. application-domain operating system 116c) for exclusively executing non-critical applications. Accordingly, the application domain 102 may include any combination of one or more application-domain operating systems 116 suitable for executing critical or non-critical applications. Further, application-domain operating systems 116 may provide (e.g. to a software developer) an option of executing a particular application as a critical application requiring integrity monitoring or a non-critical application not requiring integrity monitoring.

The hypervisor 114 may operate in any mode known in the art to allocate resources of the application hardware layer 106 (e.g. the application processor 108 or the application memory 110) to a application-domain operating system 116. For example, the hypervisor 114 may operate in an Asymmetric Multi-core Processing (AMP) mode to allocate different application-domain operating systems 116 to different processing cores of the application processor 108 configured with a multi-core architecture. In this regard, different critical applications may operate on processing cores of different architectures as desired. By way of another example, the hypervisor 114 may operate in a Symmetric Multi-core Processing (SMP) mode to divide processing power between multiple processing cores of the application processor 108 configured with a homogeneous multi-core architecture.

In some embodiments, the high-integrity multi-core heterogeneous processing environment 100 includes an integrity hardware layer 120 with an integrity processor 122 and integrity memory 124 for executing applications and services in the integrity domain 104. The integrity processor 122 may include any processor known in the art. In some embodiments, the integrity processor 122 has a different architecture than the application processor 108 (e.g. the integrity processor 122 may include processing cores having a different architecture than processing cores of the application processor 108). In this regard, integrity kernels may not be executed in the same manner on the application processor 108 and the integrity processor 122 to avoid common-mode faults in which a true fault is not detected when both the application processor 108 and the integrity processor 122 provide a fault in the same manner.

The integrity memory 124 may include any storage medium known in the art suitable for storing program instructions executable by the integrity processor 122. For example, the integrity memory 124 may include a non-transitory memory medium. By way of another example, the integrity memory 124 may include, but is not limited to, a read-only memory, a random access memory, a magnetic or optical memory device (e.g., a disk), a magnetic tape, a solid state drive and the like.

In some embodiments, the integrity domain 104 includes an integrity platform layer 126 with an integrity-domain kernel 128. The integrity-domain kernel 128 may thus host an integrity-domain operating system 130 in an integrity application layer 132 to operate on the integrity processor 122. For example, the integrity-domain kernel 128 may include a real-time kernel suitable for hosting a real-time-capable integrity-domain operating system 130 (e.g. an RTOS or an RTE).

The integrity-domain operating system 130 may execute critical platform applications and services such as, but not limited to, integrity services for the application processor 108. In some embodiments, the integrity-domain operating system 130 includes an integrity manager 134 (e.g. integrity BITE manager (IBM)) to dynamically generate integrity kernels for testing the functionality of the application processor 108. For example, the integrity manager 134 may dynamically generate any combination of an executable instruction set or input seeds as an integrity kernel for dynamically testing the functionality of the application processor 108.

In some embodiments, application-domain operating systems 116 configured to execute critical applications requiring integrity monitoring include an integrity tester 136 (e.g. integrity BITE tester (IBT)) for executing integrity kernels generated by the integrity manager 134 on the application processor 108.

In some embodiments, the high-integrity multi-core heterogeneous processing environment 100 includes a communication channel between the integrity manager 134 in the integrity domain 104 and any in the application domain 102. The communication channel may be leveraged in a variety of ways such as, but not limited to, scheduling the execution of integrity kernels on the application processor 108, providing dynamically generated integrity kernels from the integrity manager 134 to integrity testers 136, providing results of integrity kernels executed on the application processor 108 to the integrity manager 134 for evaluation, or the like.

In some embodiments, the communication channel includes an integrity management interface 138 (IMI) providing a communication link between operating systems on an application layer and a platform layer as well as a heterogeneous processor interface 140 (HPI) providing a communication link between the application processor 108 and the integrity processor 122. For example, the integrity management interface 138 may provide a communication link between the integrity-domain operating system 130 and the integrity-domain kernel 128 in the integrity domain 104. By way of another example, the integrity management interface 138 may provide a communication link between an integrity tester 136 and the hypervisor 114 in the application domain 102.

The high-integrity multi-core heterogeneous processing environment 100 may execute integrity kernels at any point and at sufficient intervals to provide an undetected fault rate during execution of critical applications on the application processor 108 below a selected integrity specification. In some embodiments, one or more integrity kernels are executed on the prior to and/or subsequent to the execution of a critical application on the application processor 108. Accordingly, integrity testers 136 in the application domain 102 may register with the hypervisor 114 via the integrity management interface 138 to schedule the execution of an integrity kernel on the application processor 108. The hypervisor 114 may then register with the integrity-domain kernel 128 in the integrity domain 104 via the heterogeneous processor interface 140. The integrity-domain kernel 128 may then register with the integrity manager 134 of the integrity-domain operating system 130 via the integrity management interface 138 to trigger the dynamic generation of an integrity kernel. The same communication channel may then be leveraged to transfer the dynamically-generated integrity kernel to the registered integrity tester 136 and to transfer the result of the execution of the dynamically-generated integrity kernel on the application processor 108 to the integrity manager 134.

In some embodiments, integrity kernels are scheduled to be executed at periodic intervals. The scheduling of integrity kernel execution may occur at any level of the high-integrity multi-core heterogeneous processing environment 100. For example, the integrity-domain operating system 130 may provide signals (e.g. interrupts) to an application-domain operating system 116 (e.g. to a supervisor of the application-domain operating system 116) to receive an integrity kernel, evaluate the integrity kernel on the application processor 108, and transmit the results to the integrity manager 134. By way of another example, the hypervisor 114 may provide signals to an application-domain operating system 116 to receive an integrity kernel, evaluate the integrity kernel on the application processor 108, and transmit the results to the integrity manager 134. By way of another example, a supervisor of an application-domain operating system 116 may schedule an integrity tester 136 to register for an integrity kernel at periodic intervals.

In some embodiments, the integrity manager 134 evaluates the results of integrity kernels (e.g. a combination of an executable instruction set an input seeds) executed on the application processor 108 received from integrity testers 136 through the communication channel. For example, the integrity manager 134 may evaluate the result of an integrity kernel executed on the application processor 108 by evaluating the result against an expected result (e.g. a hash value based on computations of an executed integrity kernel). The integrity manager 134 may generate the expected result by any means. In some embodiments, the integrity manager 134 may generate an expected result to an integrity kernel by executing the integrity kernel on the integrity processor 122 on the fly for direct comparison with the integrity kernel executed on the application processor 108. In some embodiments, the integrity manager 134 may retrieve a predetermined expected result to an integrity kernel. For example, a series of integrity kernels may be executed on the integrity processor 122 and stored (e.g. as a look-up table) in persistent storage (e.g. memory) and retrieved to evaluate the integrity kernels executed on the fly on the application processor 108.

In some embodiments, the integrity domain 104 is itself a high-integrity processing sub-environment. For example, the integrity processor 122 may include, but is not required to include, two or more processing cores configured to simultaneously execute the same instructions (e.g. an integrity kernel) in a lock-step fashion. The integrity domain 104 may further include a comparator to compare results from the two or more processing cores of the integrity processor 122 and reset offending cores in the event of a miscompare. The integrity domain 104 may thus operate with a selected integrity specification. In this regard, the integrity domain 104 may provide robust integrity services for critical applications executing in the application domain 102 with minimal faults associated with the integrity processor 122. Further, the integrity specifications of the integrity domain 104 and the high-integrity multi-core heterogeneous processing environment as a whole may be the same or different. For example, the high-integrity multi-core heterogeneous processing environment may provide an undetected fault rate that is lower than that of the integrity domain 104.

The integrity manager 134 may provide a variety of corrective actions in the event of a fault of the communication channel or a miscompare between the result of an integrity kernel executed on the application processor 108 and an expected result. For example, all faults may be logged (e.g. in a log file in a persistent storage device) for subsequent debugging or diagnostics. In some embodiments, the integrity manager 134 may provide reset signals to reset components in the application domain 102 (e.g. one or more processing cores of the application processor 108, the application platform layer 112, or an application-domain operating system 116). For example, in the event that an integrity tester 136 fails to communicate properly with the integrity manager 134 (e.g. becomes unresponsive or responds after an undesirable delay), the integrity manager 134 may send a reset signal (e.g. via the heterogeneous processor interface 140) to reset the offending integrity tester 136, the offending application-domain operating system 116, or the offending processing core of the application processor 108.

In the event of a miscompare between the result of an integrity kernel executed on the application processor 108 and an expected result, the integrity manager 134 may execute varying levels of corrective actions. For example, the integrity manager 134 may issue reset signals to reset and reload components of the application domain 102 at the application platform layer 112. For example, the integrity manager 134 may issue reset signals to the hypervisor 114 to reset the hypervisor 114 and/or the offending application-domain operating system 116. By way of another example, the hypervisor 114 may issue a reset signal to the user-accessible application layer 118 (e.g. via the heterogeneous processor interface 140 and the hypervisor 114). In this regard, the user-accessible application layer 118 may take corrective action such as resetting the entire application-domain operating system 116 or just an isolated partition. Upon reset, the integrity tester 136 may reestablish communication with the integrity manager 134. In the event of a persistent failure, the integrity manager 134 may leverage higher-level authority to clear the erroneous behavior.

It is to be understood that specific references to components of the high-integrity multi-core heterogeneous processing environment 100 described above and illustrated in FIG. 2 are provided merely for illustrative purposes and should not be interpreted as limiting. For example, the user-accessible application layer 118 of the application domain 102 may include any number of application-domain operating systems 116 with any configuration suitable for executing critical and/or non-critical applications.

Figure 2:
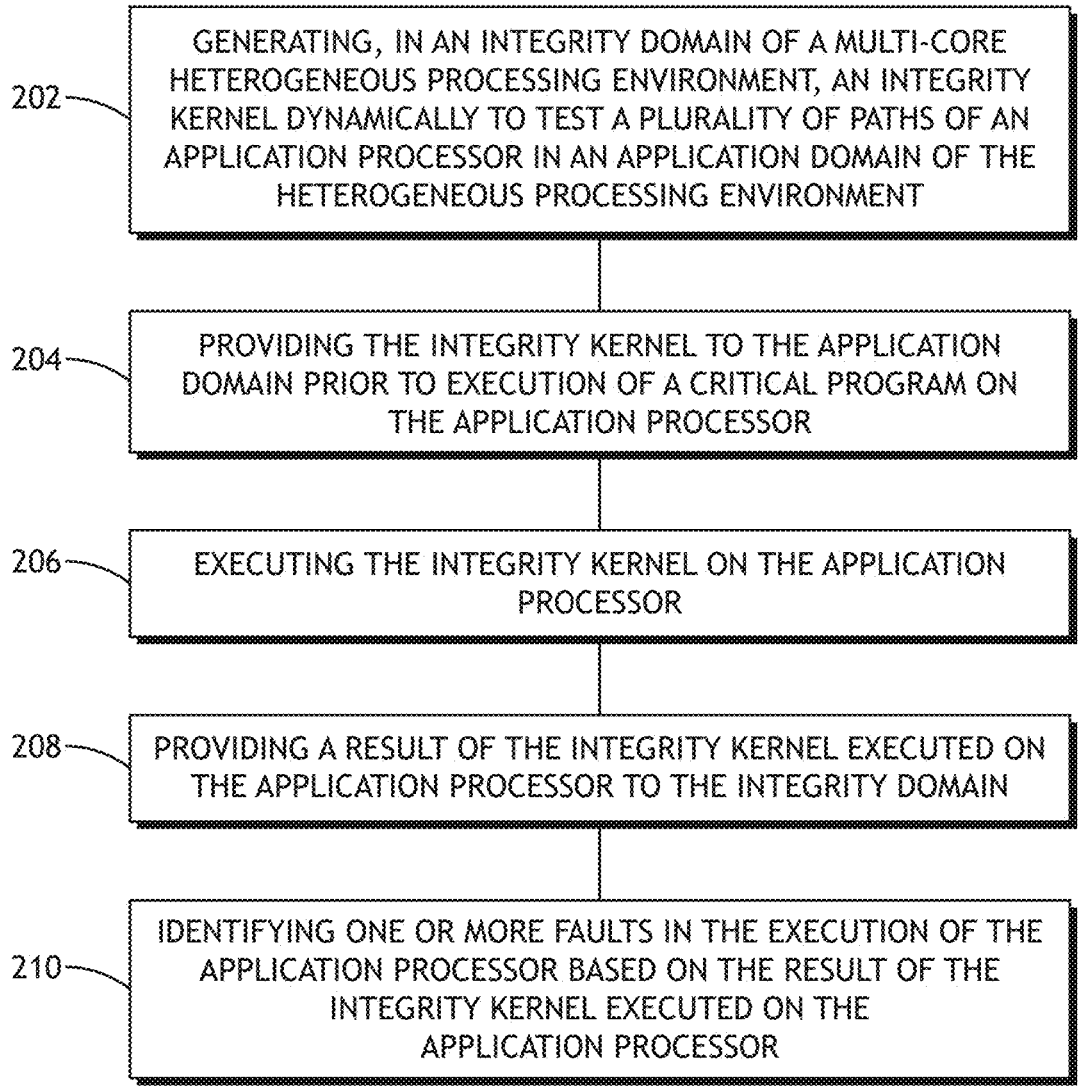
FIG. 2 is an exemplary embodiment of a method according to the inventive concepts disclosed herein.

Referring now to FIG. 2, an exemplary embodiment of a method according to the inventive concepts disclosed herein may include one or more of the following steps. The method 200 may be utilized to provide high-integrity computing on a multi-core heterogeneous processing environment. The embodiments and enabling technologies described previously herein in the context of high-integrity multi-core heterogeneous processing environment 100 should be interpreted to extend to method 200. However, the method 200 is not limited to the architecture of high-integrity multi-core heterogeneous processing environment 100.

A step 202 may include generating, in an integrity domain of a multi-core heterogeneous processing environment, an integrity kernel dynamically to test a plurality of paths of an application processor in an application domain of the heterogeneous processing environment. For example, the step 202 may include dynamically generating any combination of an executable instruction set or input seeds to form an integrity kernel. Further, the integrity kernel may be designed to execute efficiently test the functionality of the application processor by exercising a plurality of processing paths on the application processor to evaluate the operation of non-deterministic features of the application processor (e.g. asynchronous hardware events, out-of-order instruction executions or speculative instruction executions). In some embodiments, the application processor includes one or more processing cores different than an integrity processor of the integrity domain. Accordingly, the integrity processor in the integrity domain may be independent from the application processor in the application domain to avoid common-mode failures in which both the integrity processor and the application processor execute an integrity kernel in the same way and thus potentially fail in the same way such that a fault is not detected.

A step 204 may include providing the integrity kernel to the integrity domain prior to execution of a critical program on the application processor (e.g. via a communication pathway between the integrity domain and the application domain. A step 206 may include executing the integrity kernel on the application processor. A step 208 may include providing a result (e.g. a hash value) of the integrity kernel executed on the application processor to the integrity domain (e.g. via the communication pathway between the integrity domain and the application domain).

A step 210 may include identifying one or more faults in the application processor based on the result of the integrity kernel executed on the application processor. For example, faults may be identified based on evaluating the response provided in step 208 against an expected result, which may be retrieved from persistent storage (e.g. a memory device) or may be generated by the integrity domain on the fly by executing the integrity kernel on the integrity processor.

The method may further include generating additional integrity kernels, providing the additional integrity kernels to the application domain, executing the additional integrity kernels on the application processor, providing the result of the additional integrity kernels executed on the application processor to the integrity domain, and identifying faults based on the result of the additional integrity kernels executed on the application processor. For example, additional integrity kernels may be dynamically generated and executed subsequent to the execution of critical programs, at a periodic interval, or in response to a request generated in either the application domain or the integrity domain. In a general sense, integrity kernels may be dynamically generated and executed any number of times and at any interval to ensure that critical applications executing on the application processor achieve an undetected fault rate below a selected integrity specification.

The method may further include generating reset signals to reset and/or reload any portion of the application domain in response to identified faults in step 210. For example, any of the application processor or associated platform or application layers of the application domain may be reset based on identified faults in step 210.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form hereinbefore described being merely an explanatory embodiment thereof, it is the intention of the following claims to encompass and include such changes.

What is claimed is:

1. A high-integrity multi-core heterogeneous processing environment, comprising:
    an application processor comprising one or more processing cores and having a first architecture;
    an integrity tester for executing integrity kernels on the application processor;
    an integrity processor comprising a second architecture; and
    an integrity manager operating on the integrity processor; the integrity manager configured to:
        dynamically generate an integrity kernel to test a plurality of paths of the application processor;
        provide the integrity kernel to the integrity tester prior to the execution of a critical program on the application processor; and
        identify one or more faults in the application processor based on a result of the integrity kernel executed on the application processor received from the integrity tester.

2. The high-integrity multi-core heterogeneous processing environment of claim 1, wherein the integrity kernel comprises an executable instruction set configured to operate on one or more input seeds to provide the test of the plurality of paths of the application processor, wherein the integrity manager dynamically-generates the integrity kernel by generating the one or more input seeds.

3. The high-integrity multi-core heterogeneous processing environment of claim 1, wherein the integrity kernel comprises an executable instruction set configured to operate on one or more input seeds to provide the test of the plurality of paths of the application processor, wherein the integrity manager dynamically-generates the integrity kernel by dynamically generating the executable instruction set on the fly.

4. The high-integrity multi-core heterogeneous processing environment of claim 1, wherein the integrity kernel comprises an executable instruction set configured to operate on one or more input seeds to provide the test of the plurality of paths of the application processor, wherein the integrity manager dynamically-generates the integrity kernel by selecting an executable instruction set from a number of available executable instruction sets.

5. The high-integrity multi-core heterogeneous processing environment of claim 1, wherein the integrity manager identifies the faults in the application processor by verifying the result of the integrity kernel executed on the application processor with a control result of the integrity kernel executed on the integrity processor on the fly.

6. The high-integrity multi-core heterogeneous processing environment of claim 1, wherein the integrity manager identifies the faults in the application processor by verifying the result of the integrity kernel executed on the application processor with a predetermined control result.

7. The high-integrity multi-core heterogeneous processing environment of claim 1, wherein the integrity manager is further configured to dynamically generate an additional integrity kernel, wherein the integrity manager is further configured to provide the additional integrity kernel to the integrity tester subsequent to the execution of the critical program, wherein the integrity manager is further configured to identify faults in the application processor by evaluating a result of the additional integrity kernel executed on the application processor received from the integrity tester.

8. The high-integrity multi-core heterogeneous processing environment of claim 1, wherein the second architecture is different than the first architecture.

9. The high-integrity multi-core heterogeneous processing environment of claim 1, wherein the integrity processor comprises:
    two or more processing cores configured to simultaneously execute instructions in parallel to provide a fault rate of the integrity processor within an additional selected integrity specification.

10. The high-integrity multi-core heterogeneous processing environment of claim 1, wherein the integrity-domain operating system is configured to generate reset signals based on the one or more identified faults to reset at least one of the application-domain operating system or the application processor.

11. A high-integrity multi-core heterogeneous processing environment, comprising:
    an application domain, comprising:
        an application processor comprising one or more processing cores;
        a hypervisor to host one or more application-domain operating systems operating on the application processor; and
        one or more integrity testers for executing integrity kernels on the application processor;
    an integrity domain to support the application domain, comprising:
        an integrity processor comprising an architecture different than the application processor; and
        a real-time integrity-domain kernel to host an integrity-domain operating system, the integrity-domain operating system comprising an integrity manager operating on the integrity processor, the integrity manager configured to dynamically generate an integrity kernel to test a plurality of paths of the application processor, the integrity manager further configured to provide the integrity kernel to an integrity tester of the one or more integrity testers prior to execution of a critical program by at least one application-domain operating system of the one or more application-domain operating systems, the integrity manager further configured to identify one or more faults in the application processor based on a result of the integrity kernel executed on the application processor received from the integrity tester.

12. The high-integrity multi-core heterogeneous processing environment of claim 11, wherein the integrity kernel comprises an executable instruction set configured to operate on one or more input seeds to provide the test of the plurality of paths of the application processor, wherein the integrity manager dynamically-generates the integrity kernel by at least one of generating the one or more input seeds, dynamically generating the executable instruction set on the fly, or selecting an executable instruction set from a number of available executable instruction sets.

13. The high-integrity multi-core heterogeneous processing environment of claim 11, wherein the integrity manager identifies the faults in the application processor by verifying the result of the integrity kernel executed on the application processor with at least one of a control result of the integrity kernel executed on the integrity processor on the fly or a predetermined control result.

14. The high-integrity multi-core heterogeneous processing environment of claim 11, wherein the integrity manager is further configured to dynamically generate an additional integrity kernel, wherein the integrity manager is further configured to provide the additional integrity kernel to the integrity tester subsequent to the execution of the critical program, wherein the integrity manager is further configured to identify faults in the application processor by evaluating a result of the additional integrity kernel executed on the application processor received from the integrity tester.

15. The high-integrity multi-core heterogeneous processing environment of claim 11, wherein the integrity processor comprises:
two or more processing cores configured to simultaneously execute instructions in parallel to provide fault detection of the integrity processor within an additional selected integrity specification.

16. A method for high-integrity computing, comprising:
generating, in an integrity domain of a multi-core heterogeneous processing environment, an integrity kernel dynamically to test a plurality of paths of an application processor in an application domain of the multi-core heterogeneous processing environment, wherein the application processor comprises one or more processing cores having a different architecture than processing cores of an integrity processor of the integrity domain;
providing the integrity kernel to the application domain prior to execution of a critical program on the application processor;
executing the integrity kernel on the application processor;
providing a result of the integrity kernel executed on the application processor to the integrity domain; and
identifying one or more faults in the application processor based on the result of the integrity kernel executed on the application processor.

17. The method for high-integrity computing of claim 16, wherein the integrity kernel comprises an executable instruction set configured to operate on one or more input seeds to provide the test of the plurality of paths of the application processor, wherein generating the integrity kernel dynamically comprises:
generating at least one of the one or more input seeds or the executable instruction set dynamically.

18. The method for high-integrity computing of claim 16, wherein identifying the one or more faults in the application processor comprises:
verifying the response from the integrity tester with at least one of a control result of the integrity kernel executed on the integrity processor on the fly or a predetermined control result.

19. The method for high-integrity computing of claim 16, further comprising:
generating, in the integrity domain, an additional integrity kernel dynamically to test a plurality of the paths of the application processor;
providing the additional integrity kernel to the application domain subsequent to execution of the critical program;
executing the additional integrity kernel on the application processor;
providing a result of the additional integrity kernel executed on the application processor to the integrity domain; and
identifying the one or more faults in the application processor based on the result of the additional integrity kernel executed on the application processor.

20. The method for high-integrity computing of claim 16, further comprising:
generating reset signals based on the identified faults to reset at least one of the application-domain operating system or the application processor.

* * * * *